United States Patent
Szigeti et al.

(10) Patent No.: US 12,362,993 B2
(45) Date of Patent: Jul. 15, 2025

(54) INTELLIGENT CLOSED-LOOP DEVICE PROFILING FOR PROACTIVE BEHAVIORAL EXPECTATIONS

(71) Applicant: Cisco Technology, Inc., San Jose, CA (US)

(72) Inventors: Thomas Szigeti, Vancouver (CA); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 17/748,930

(22) Filed: May 19, 2022

(65) Prior Publication Data

US 2023/0379213 A1   Nov. 23, 2023

(51) Int. Cl.
| | |
|---|---|
| *H04L 41/082* | (2022.01) |
| *H04L 41/0604* | (2022.01) |
| *H04L 41/0631* | (2022.01) |
| *H04L 41/0681* | (2022.01) |

(52) U.S. Cl.
CPC ........ *H04L 41/082* (2013.01); *H04L 41/0604* (2013.01); *H04L 41/0645* (2013.01); *H04L 41/0681* (2013.01)

(58) Field of Classification Search
None
See application file for complete search history.

(56) References Cited

U.S. PATENT DOCUMENTS

| | | | | |
|---|---|---|---|---|
| 7,954,090 | B1 * | 5/2011 | Qureshi | G06N 5/048 |
| | | | | 714/48 |
| 8,856,894 | B1 * | 10/2014 | Dean | H04L 9/32 |
| | | | | 726/5 |
| 8,903,995 | B1 * | 12/2014 | Basak | G06Q 10/06 |
| | | | | 709/224 |
| 9,154,516 | B1 * | 10/2015 | Vaystikh | H04L 63/1425 |
| 9,923,911 | B2 | 3/2018 | Vasseur et al. | |
| 10,044,736 | B1 * | 8/2018 | Barger | H04L 63/145 |
| 10,542,021 | B1 * | 1/2020 | Mehr | H04L 63/1416 |
| 10,623,273 | B2 | 4/2020 | Di Pietro et al. | |
| 11,201,881 | B2 * | 12/2021 | Janakiraman | H04L 67/306 |
| 12,284,192 | B2 * | 4/2025 | Malhotra et al. | H04L 63/1416 |
| 2008/0022404 | A1 * | 1/2008 | Holtmanns | G06F 21/57 |
| | | | | 726/23 |
| 2013/0298184 | A1 * | 11/2013 | Ermagan | G06F 21/54 |
| | | | | 726/1 |
| 2016/0072834 | A1 * | 3/2016 | Bott | H04L 63/145 |
| | | | | 726/1 |

(Continued)

FOREIGN PATENT DOCUMENTS

| | | | | |
|---|---|---|---|---|
| EP | 3783856 A1 | 2/2021 | | |
| WO | WO-2021197806 A1 * | 10/2021 | ......... | H04L 63/1425 |
| WO | WO-2023009624 A1 * | 2/2023 | | |

*Primary Examiner* — Sandarva Khanal
(74) *Attorney, Agent, or Firm* — BEHMKE INNOVATION GROUP LLC; James M. Behmke; James J. Wong

(57) ABSTRACT

In an embodiment, a device controller determines a deliberate change to be made within a network, and generates a profile of a behavioral update that an analytics engine should expect to see based on the deliberate change. The device controller then transmits, to the analytics engine, the profile of the behavioral update to cause the analytics engine to proactively expect the behavioral update in response to the deliberate change.

17 Claims, 9 Drawing Sheets

(56) References Cited

U.S. PATENT DOCUMENTS

| | | | |
|---|---|---|---|
| 2016/0078365 A1* | 3/2016 | Baumard | H04L 63/1425 |
| | | | 706/12 |
| 2016/0234232 A1* | 8/2016 | Poder | H04L 63/1416 |
| 2016/0261465 A1 | 9/2016 | Gupta et al. | |
| 2016/0359878 A1* | 12/2016 | Prasad | H04L 43/0858 |
| 2017/0104775 A1* | 4/2017 | Vasseur | H04L 43/0876 |
| 2017/0149812 A1* | 5/2017 | Alton | G06N 20/00 |
| 2017/0279830 A1 | 9/2017 | Mermoud et al. | |
| 2017/0279832 A1* | 9/2017 | Di Pietro | H04L 63/1458 |
| 2017/0316342 A1* | 11/2017 | Franc | G06N 20/10 |
| 2018/0034840 A1* | 2/2018 | Marquardt | G06N 7/01 |
| 2018/0047065 A1* | 2/2018 | Wildberger | H04L 67/535 |
| 2019/0166141 A1* | 5/2019 | Xu | G06N 3/047 |
| 2020/0137094 A1* | 4/2020 | Janakiraman | G06N 20/00 |
| 2020/0169576 A1* | 5/2020 | Myers | H04L 43/062 |
| 2020/0195670 A1* | 6/2020 | Deardorff | H04L 63/1441 |
| 2020/0195679 A1 | 6/2020 | Du | |
| 2020/0252416 A1* | 8/2020 | Niv | H04L 41/0661 |
| 2020/0366702 A1 | 11/2020 | Mahaffey et al. | |
| 2021/0377133 A1* | 12/2021 | Gustavsson | H04L 43/022 |
| 2022/0103619 A1* | 3/2022 | Dekel | H04L 67/1031 |

\* cited by examiner

400

| ✻ COMPONENT TAGS | ▼ ◇ Network analysis |
|---|---|
| ☐ Components without tags | ☐ ◇ Port Scan |
| ☐ ▼ ◇ Device - Level 0-1 | ☐ ◇ Port Scan Target |
|    ☐ ◆ IO Module (3) | ☐ ◇ Public IP (19) |
|    ☐ ◆ Wireless IO Module (2) | ☐ ▼ ◇ Software |
| ☐ ▼ ◇ Device - Level 2 | ☐ ◇ Active Directory |
|    ☐ ◇ Citect Alarm Server | ☐ ◇ CodeSys |
|    ☐ ◇ Citect IO Server | ☐ ◇ DFS |
|    ☐ ◇ Citect Report Server | ☐ ◇ Lotus notes |
|    ☐ ◇ Citect Trend Server | ☐ ◇ Microsoft Exchange |
|    ☐ ◇ Engineering Station (3) | ☐ ◇ NSIS |
|    ☐ ◇ Master | ☐ ◇ NetLogon |
|    ☐ ◇ PLC (9) | ☐ ◇ PI Osisoft |
|    ☐ ◇ SCADA Station (3) | ☐ ◇ WINS |
|    ☐ ◇ Slave | ☐ ◇ WMI |
|    ☐ ◇ Train | ☐ ◇ WinRM |
| ☐ ▼ ◆ Device - Level 3-4 | ☐ ◇ Windows (10) |
|    ☐ ◆ Admin Server (1) | ☐ ◇ Windows Audio |
|    ☐ ◆ DNS Server (2) | ☐ ◇ Windows CSP |
|    ☐ ◆ Database Server | ☐ ◇ Windows Connection Manager |
|    ☐ ◆ Email Server | ☐ ◇ Windows DTCPing |
|    ☐ ◆ File Transfer Server | ☐ ◇ Windows File Protection |
|    ☐ ◆ HTTP Client | ☐ ◇ Windows Messenger Service |
|    ☐ ◆ Historian | ☐ ◇ Windows Network DDE |
|    ☐ ◆ Host Config Server (3) | ☐ ◇ Windows Plug and Play |
|    ☐ ◆ Key Management Server | ☐ ◇ Windows SCM |
|    ☐ ◆ License Management Server | ☐ ◇ Windows SecondaryLogon |
|    ☐ ◆ Log Server | ☐ ◇ Windows Task Scheduler |
| | ☐ ◇ Windows WebClient |

FIG. 4A

Component

Yokogawa 192.168.11...
IP: 192.168.119.131
MAC: 00:00:64:98:b7:6b

First activity
Sep 24, 2019 4:34:12 PM

Last activity
Sep 25, 2019 10:10:09 AM

Tags: ⬥ Engineering Station, ⬥ PLC, ⬥ CodeSys, ⬥ Lotus notes, ⬥ PI Osisoft

Activity tags: ⬥ Heartbeat, ⬥ Read Var, ⬥ Citect Alarm, ⬥ Citect IO, ⬥ Citect Report, ⬥ Citect Trend, ⬥ SCADA Station, ⬥ Authentication, ⬥ Database, ⬥ Net Management ...22+

Properties: vendor-name: Yokogawa Digital Computer Corporation
name: Yokogawa 192.168.119.131
ip: 192.168.119.131
public-ip: no
mac: 00:00:64:98:b7:6b

FIG. 5

INTELLIGENT CLOSED-LOOP DEVICE PROFILING FOR PROACTIVE BEHAVIORAL EXPECTATIONS

TECHNICAL FIELD

The present disclosure relates generally to computer networks, and, more particularly, to intelligent closed-loop device profiling for proactive behavioral expectations.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

The nature of the IoT makes network security particularly challenging, especially in the case of industrial settings, such as factories, mines, ports, power substations, and the like. Indeed, these types of networks are typically large scale in nature, include a variety of legacy devices that do not support authentication methods (e.g., 802.1x) and lack system patching, making it very difficult to define adequate security policies for each device.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate example displays of component and activity tags;

FIG. 5 illustrates an example display of an asset profile;

DESCRIPTION OF EXAMPLE EMBODIMENTS

Overview

Figure 1:
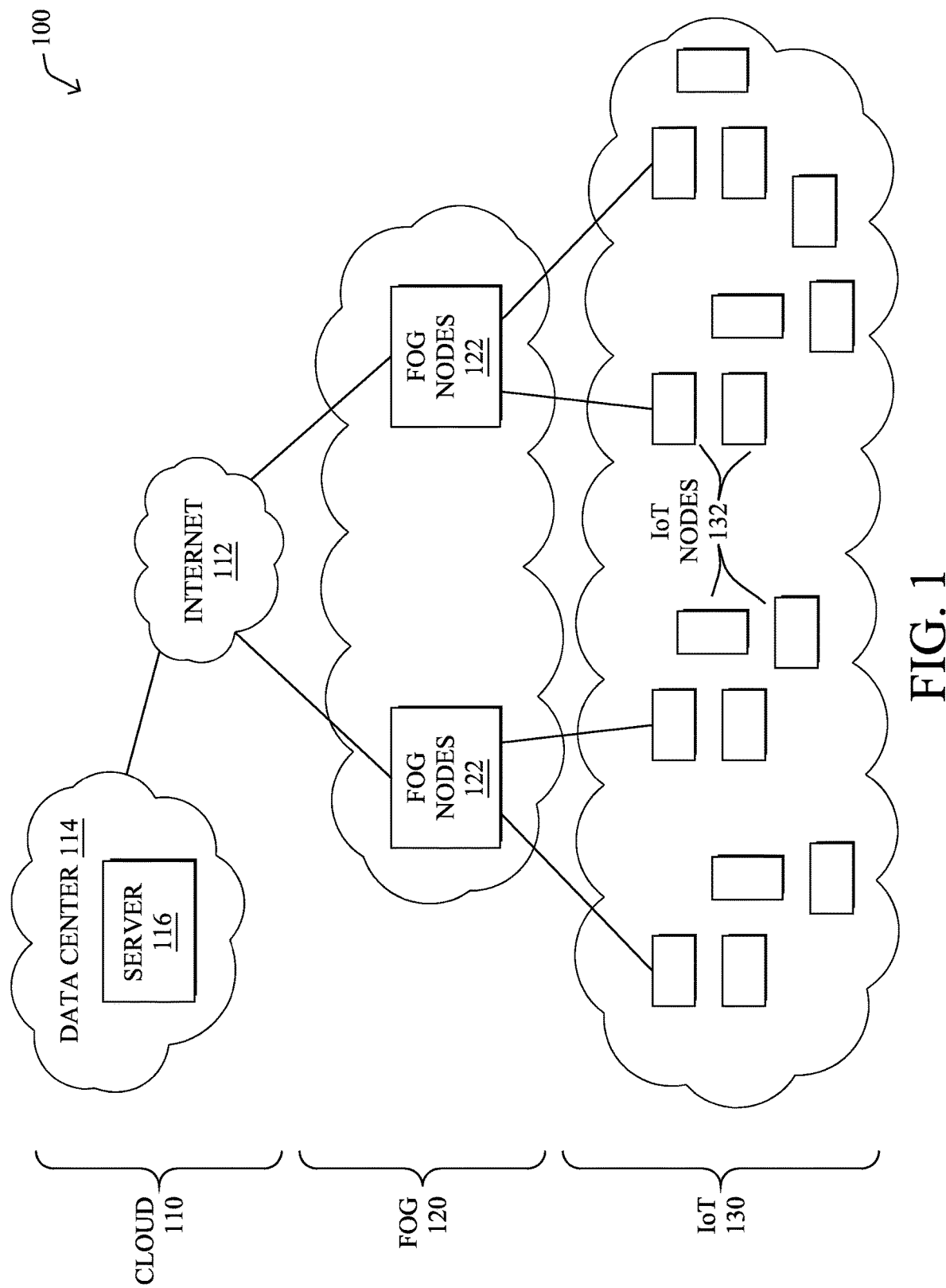
FIG. 1 illustrates an example network.

According to one or more embodiments of the disclosure, intelligent closed-loop device profiling for proactive behavioral expectations is described herein. In particular, in one embodiment, a device controller determines a deliberate change to be made within a network, and generates a profile of a behavioral update that an analytics engine should expect to see based on the deliberate change. The device controller then transmits, to the analytics engine, the profile of the behavioral update to cause the analytics engine to proactively expect the behavioral update in response to the deliberate change.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely a cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
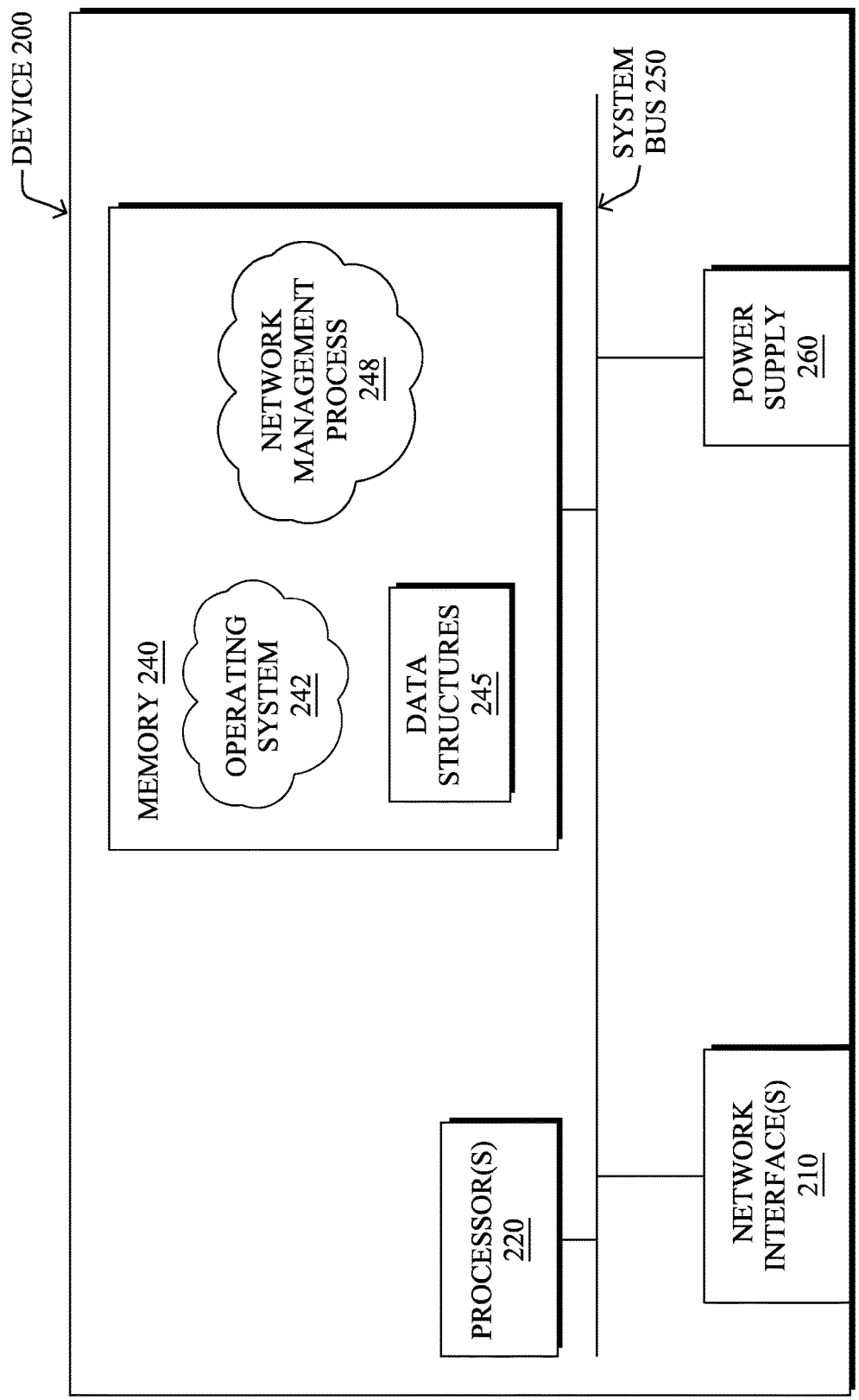
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections/interfaces 210, e.g., wireless and wired/physical connections, and that the view herein is merely for illustration. Also, while the network interface 210 is shown separately from power supply 260, for powerline communications the network interface 210 may communicate through the power supply 260, or may be an integral component of the power supply. In some specific configurations the powerline communication signal may be coupled to the power line feeding into the power supply.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an illustrative "network management" process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network security (e.g., one example implementation of network management process 248 on a corresponding security device) may be configured to perform any or all of the following tasks:

1. Identifying and classifying devices in the network—this may entail, for example, determining the make, model, software configuration, type, etc. of a given device.
2. Discerning operational insights about a device—for example, network security processes may assess the traffic of a particular device, to determine what the device is doing, or attempting to do, via the network. Such information may take the form of device details and communication maps for the device. In further cases, the device functions and application flows may be converted into tags and/or events for presentation to a user interface. Further, network security processes may also track variable changes, to monitor the integrity of the industrial workflow.
3. Detecting anomalies—network security processes may also assess the behaviors of a device on the network, to determine whether its behaviors are anomalous. In various embodiments, this may entail network security processes determining whether the behavior of the device has changed significantly over time and/or does not fit the expected behavioral pattern for its classification. For example, if the device is identifies as being a temperature sensor that periodically sends temperature measurements to a supervisory service, but the device is instead communicating data elsewhere, network security processes may deem this behavior anomalous.

In various embodiments, network security processes herein may employ any number of machine learning (ML) and/or artificial intelligence (AI) techniques, to assess the gathered telemetry data regarding the traffic of the device. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, network security processes can use the model M to classify new data points, such as information regarding new traffic flows in the network. Often, M is a statistical model, and the cost function is inversely proportional to the likelihood of M, given the input data.

In various embodiments, network security processes may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "suspicious." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that network security processes can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network security processes may assess the captured telemetry data on a per-flow basis. In other embodiments, network security processes may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Notably, certain aspects of the techniques herein may be based on approaches to tag assets/devices in a network based on their telemetry data. In some aspects, this tagging can be used to drive network policy enforcement regarding the assets.

Figure 3:
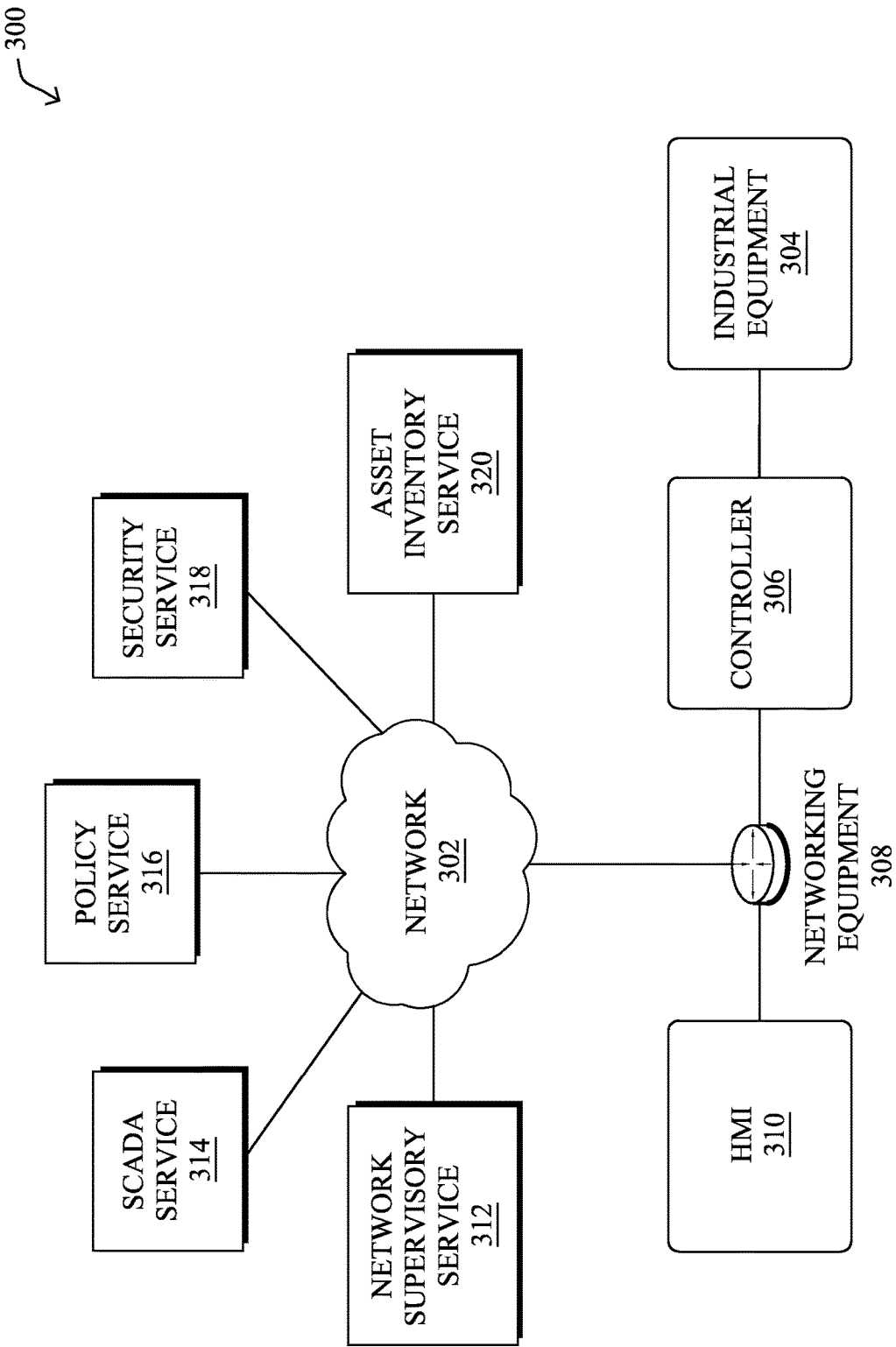
FIG. 3 illustrates an example network architecture for an industrial network.

For example, FIG. 3 illustrates an example network architecture 300 for an industrial network, according to various embodiments. As shown, architecture 300 may include industrial equipment 304 connected to a controller 306, such as a programmable logic controllers (PLC), a variable frequency drive (VFD), or the like, that controls the operations of industrial equipment 304. In turn, controller 306 for industrial equipment 304 may be connected to a human-machine interface (HMI) 310 via networking equipment 308, allowing a human user to interface with it (e.g., to visualize the industrial process, issue commands, etc.). In addition, networking equipment 308 may also provide connectivity via the greater network 302 to any number of network services 312-320 provided in the local network of networking equipment 308 and/or remotely. For example, services 312-320 may be implemented in the local network via dedicated equipment or virtualized across any number of devices (e.g., networking equipment 308). In other cases, services 312-320 may be provided by servers in a remote data center, the cloud, or the like.

As would be appreciated, industrial equipment 304 may differ, depending on the industrial setting in which architecture 300 is implemented. In many cases, industrial equipment 304 may comprise an actuator such as, but not limited to, a motor, a pump, a solenoid, or the like. In other cases, industrial equipment 304 may include a circuit and controller 306 may control the powering of the circuit.

Industrial equipment 304 may also include any number of sensors configured to take measurements regarding the physical process implemented by industrial equipment 304. For example, such sensors may take temperature readings, distance measurements, humidity readings, voltage or amperage measurements, or the like, and provide them to controller 306 for industrial equipment 304. During operation, controller 306 may use the sensor data from industrial equipment 304 as part of a control loop, thereby allowing controller 306 to adjust the industrial process as needed.

HMI 310 may include a dedicated touch screen display or may take the form of a workstation, portable tablet or other handheld, or the like. Thus, during operation, visualization data may be provided to HMI 310 regarding the industrial process performed by industrial equipment 304. For example, such visualizations may include a graphical representation of the industrial process (e.g., the filling of a tank, etc.), the sensor data from industrial equipment 304, the control parameter values used by controller 306, or the like. In some embodiments, HMI 310 may also allow for the reconfiguration of controller 306, such as by adjusting its control parameters for industrial equipment 304 (e.g., to shut down the industrial process, etc.).

Networking equipment 308 may include any number of switches, routers, firewalls, telemetry exporters and/or collectors, gateways, bridges, and the like. In some embodiments, these networking functions may be performed in a virtualized/containerized manner. For example, a telemetry exporter may take the form of a containerized application installed to networking equipment 308, to collect and export telemetry regarding the operation networking equipment 308 (e.g., queue state information, memory or processor resource utilization, etc.) and/or network 302 (e.g., measured delays, drops, jitter, etc.).

In some embodiments, at least a portion of network 302 may be implemented as a software-defined network (SDN). In such implementations, control plane decisions by the networking equipment of network 302, such as networking equipment 308, may be centralized with an SDN controller. For example, rather than networking equipment 308 establishing routing paths and making other control decisions, individually, such decisions can be centralized with an SDN controller (e.g., network supervisory service 312, etc.).

During operation, network supervisory service 312 may function to monitor the status and health of network 302 and networking equipment 308. An example of such a network supervisory service is DNA-Center by Cisco Systems, Inc. For example, in some implementations, network supervisory service 312 may take the form of a network assurance service that assesses the health of network 302 and networking equipment 308 through the use of heuristics, rules, and/or machine learning models. In some cases, this monitoring can also be predictive in nature, allowing network supervisory service 312 to predict failures and other network conditions before they actually occur. In either case, network supervisory service 312 may also provide control over network 302, such as by reconfiguring networking equipment 308, adjusting routing in network 302, and the like. As noted above, network supervisory service 312 may also function as an SDN controller for networking equipment 308, in some embodiments.

As shown, architecture 300 may also include supervisory control and data acquisition (SCADA) service 314 which supervises the operation of the industrial process. More specifically, SCADA service 314 may communicate with controller 306, to receive data regarding the industrial process (e.g., sensor data from industrial equipment 304, etc.) and provide control over controller 306, such as by pushing new control routines, software updates, and the like, to controller 306.

As would be appreciated, SCADA service 314, controller 306, and/or HMI 310 may communicate using an automation protocol. Examples of such protocols may include, but are not limited to, Profibus, Modbus, DeviceNet, HART, DNP3, IEC 61850, IEC 60870-5, and the like. In addition, different protocols may be used within network 102 and among networking equipment 308, depending on the specific implementation of architecture 300. Further, different portions of network 302 may be organized into different cells or other segmented areas that are distinct from one another and interlinked via networking equipment 308.

Architecture 300 may also include a policy service 316 that is responsible for creating and managing security and access policies for endpoints in network 302. An example of such a policy service 316 is the Identity Services Engine (ISE) by Cisco Systems, Inc. In various embodiments, as detailed below, policy service 316 may also be configured to identify the types of endpoints present in network 302 (e.g., HMI 310, controller 306, etc.) and their corresponding actions/functions. In turn, this information can be used to drive the policies that policy service 316 creates.

Security service 318 is configured to enforce the various policies created and curated by policy service 316 in the network. For example, such policies may be implemented by security service 318 as access control lists (ACLs), firewall rules, or the like, that are distributed to networking equipment 308 for enforcement.

According to various embodiments, architecture 300 may also include asset inventory service 320 that is used to collect information about learned assets/endpoints in network 302 and maintain an inventory of these various devices in network 302. In various embodiments, asset inventory service 320 may do so by embedding sensing modules in networking equipment 308 which passively analyze communications between endpoints. The sensors may use deep packet inspection (DPI) to not only identify the protocols in use by a given packet (e.g., the automation protocol used between HMI 310, controller 306, and SCADA service 314), but also understand the action(s) that are being communicated and to classify both the type of device/component and its application behavior.

For example, when a sensor module executed by networking equipment 308 identifies the use of an automation protocol by a packet, it may examine the payload of each flow to identify any or all of the following:

The device type (e.g., based on passive scan of traffic and matching a known criterion, the device is classified).
The software and/or hardware versions of the device.
MAC and IP addresses of all devices with which the discovered device is communicating.
The activity profile of the device (e.g., how is it trying to communicate), and the protocol(s) it is using.
The commands that are being passed (e.g., SCADA commands, etc.), down to the specific control parameter values.

The sensor modules of networking equipment 308 then then organize the collected information into meaningful tags. In general, these tags are simply a way to categorize devices and their behaviors, similar to the same way a human may look at a pen or a pencil and categorize them as writing instruments. Each device can also have multiple tags associated with it, such as the following:

Component Tags—these tags identify device specific details (e.g., Device ID, SCADA station, PLC, Windows device, etc.).
Activity Tags—these tags identify what the device is doing at the protocol level (Programming CPU, Heartbeat, Emergency Break, Data. Push).
User-Defined Tags—these could be custom tags to supply additional context (e.g. "Cell 1 Tag").
Dynamically Generated Tags—these could be added dynamically (e.g., using ML) to signify whether the behavior of the device is normal or anomalous, or for other dynamic conditions.
Scalable Group Tags—These tags are applied to specific packet flows between a defined group of devices/services in the network. For example, in the case shown, HMI 310, controller 306, and SCADA service 314 may be tagged as belonging to a particular group.

The sensor modules embedded in networking equipment 308 may also collect metadata about the communicating devices/endpoints, including its network identifiers (e.g., IP and MAC addresses), vendor, device-type, firmware version, the switch ID and port where the device is connected, etc. As the sensor module learns details of a new device/endpoint in network 302, it may send its collected metadata about that device, along with its tags, to the asset inventory service 320.

In this manner, asset inventory service 320 may maintain an inventory of each of the endpoint devices in network 302, their associated tags, and their metadata. Thus, as new devices are discovered in network 302, their profile information is added to the live inventory of devices maintained by asset inventory service 320. As noted above, the various tags applied by the sensor modules deployed to networking equipment 308 and used by asset inventory service 320 may be predefined or may, via a user interface (not show) be user-defined.

Figure 4B:
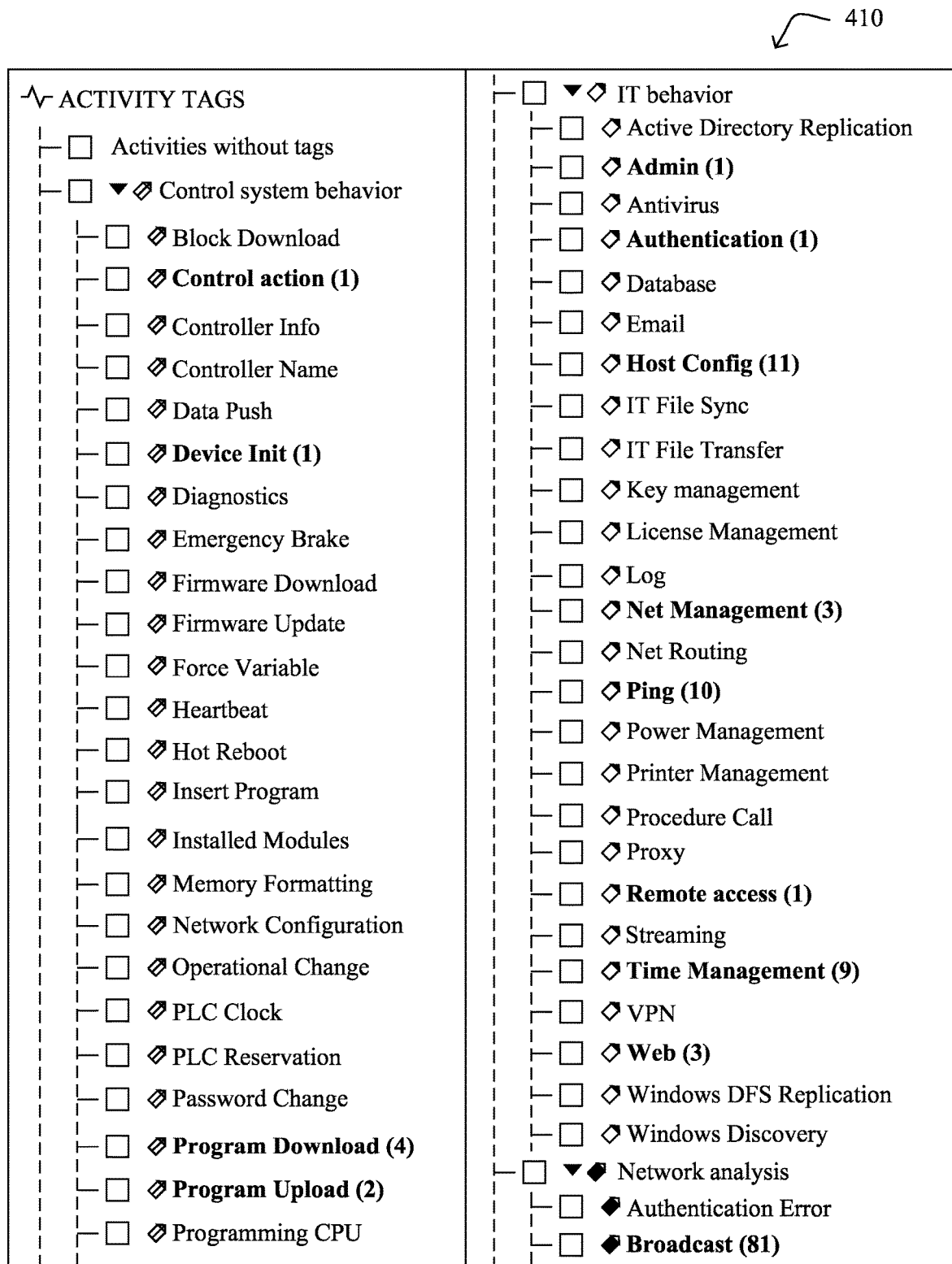

FIGS. 4A-4B illustrate example displays 400, 410, respectively, showing component and activity tags, in some embodiments. As shown, the various component tags can be used to identify a particular endpoint or other device in the network by its type (e.g., PLC, SCADA station, etc.), its software (e.g., CodeSys, Windows, etc.). In addition, analysis of the traffic of the device can also lead to various activity tags being applied to that device, as well. For example, such activity tags may distinguish between control system behaviors (e.g., insert program, device init., etc.) and IT behaviors (e.g., host config., ping, etc.).

Referring again to FIG. 3, to facilitate the labeling of devices in network 302 using tags, asset inventory service 320 may also leverage device classification functions provided by policy service 316, to identify the component and activity tags of a particular device in network 302 under scrutiny. In general, device classification (also known as "device profiling") has traditionally used static rules and heuristics for the determination. In further embodiments, the device classification by policy service 316 can be achieved by applying a trained machine learning-based classifier to the captured telemetry data from networking equipment 308. Such telemetry data can also take the form of information captured through active and/or passive probing of the device. Notably, this probing may entail policy service 316 sending any or all of the following probes via networking equipment 308:

Dynamic Host Configuration Protocol (DHCP) probes with helper addresses
SPAN probes, to get messages in INIT-REBOOT and SELECTING states, use of ARP cache for IP/MAC binding, etc.
Netflow probes
HyperText Transfer Protocol (HTTP) probes to obtain information such as the operating system (OS) of the device, Web browser information, etc.
Remote Authentication Dial-In User Service (RADIUS) probes.
Simple Network Management Protocol (SNMP) to retrieve Management Information Base (MIB) object or receives traps.
Domain Name System (DNS) probes to get the Fully Qualified Domain Name (FQDN)
etc.

Further information that may be captured by networking equipment 308 and reported via telemetry data to policy service 316 may include traffic behavioral characteristics of the traffic of a device, such as the communication protocols used, flow information, taming and pattern data, and the like. In addition, the telemetry data may be indicative of the operational intent of the endpoint device (e.g., controller 306, HMI 310, etc.).

According to various embodiments, additional information that policy service 316 and asset inventory service 320 may use to tag the various devices/components in network 302 may include any or all of the following:

Manufacturer's Usage Description (MUD) information—
As proposed in the Internet Engineering Task Force (IETF) draft entitled, "Manufacturer Usage Description Specification," devices may be configured by their manufacturers to advertise their device specifications. Such information may also indicate the intended communication patterns of the devices.

Asset Administration Shell data—this is an Industry 4.0 method to express how an IoT device should behave, including expected communication patterns.

IEC 61850 Substation Configuration Language (SCL)—data this is a language that is used primarily in the utility industry to express Intelligent Electronic Device (IED) intent.

Open Platform Communication Unified Architecture (OPC UA) data—such data provides industrial models used in manufacturing contexts.

Thus, policy service 316, asset inventory service 320, and the sensor modules and telemetry exporters of networking equipment 308 may operate in conjunction with one another to apply various tags to the devices in network 302 and their traffic flows.

FIG. 5 illustrates an example display 500 of an asset profile, in some embodiments. As can be seen, a particular asset has been identified as a Yokogawa device and has been tagged with various component and activity tags (e.g., PLC, CodeSys, Citect Report, etc.). This profile may be stored by the asset inventory service (e.g., service 320 in FIG. 3) and provide to a user interface, allowing the user to quickly learn information about the device. Such information can also be automatically updated over time, using the techniques herein.

Referring again to FIG. 3, the various tags can also be used to augment flow telemetry, such as Netflow records, IPFIX records, or the like. To do so, asset inventory service 320 may propagate any of its stored tags to a Netflow collector or other telemetry exporter. As would be appreciated, such telemetry exporters typically build flow tables based on Netflow-9 metadata, such as 5-Tuple TCP/IP information, etc. However, such telemetry collectors and analyzers do not understand what the device is or how it should be operating. According to various embodiments, augmenting a telemetry exporter to understand the OT policy and intent of industrial devices allows for better enforcement of the allowed flows in an OT environment, and improves troubleshooting when a cyber incident occurs.

In various embodiments, by tagging the endpoint devices in network architecture 300 in terms of what they are and what they should do, it becomes possible to automatically implement and enforce network policies and to quickly identify security threats. To do so, policy service 316 can be used to authenticate, authorize, and provide policies for specific endpoints and/or user in network 302. Generic elements of such a policy may specify component, activity, or other tags. For example, a generic policy may be created for all PLCs in Cell Area Zone 1. Such a policy may specify a 'PLC' component tag, as well as activity tags indicative of what types of activities the PLCs are allowed to perform, what protocols they are allowed to communicate, and with whom they are allowed to communicate. For instance, controller 306 may be allowed to communicate with other industrial devices in the same Cell Area Zone, but not beyond. In another instance, controller 306 may only be allowed to communicate with an HMI in the same zone, such as HMI 310.

Typically, a policy generated by policy service 316 will take the form of a logical combination of tags. For example, one policy may be as follows:

IF the device is a PLC AND is in CELL-1 THEN it may talk to device-x

When this policy is deployed to networking equipment 308, controller 306 may be allowed to communicate with HMI 310, but may be restricted from communicating with other devices via network 302. Notably, this can even lead to policies that are cell/zone specific in the OT network 302 (e.g., a PLC is restricted from communicating with other devices outside of its cell).

During operation, policy service 316 may receive updates from asset inventory service 320, either periodically or on demand. This allows policy service 316 visibility into all of the discovered devices on the network, along with their tags and other metadata. Preferably, policy service 316 will use the same tag format as that of asset inventory service 320. In turn, policy service 316 may create an entry for the device based on what has been discovered, with specific data updated based on information learned by the sensor in networking equipment 308 (e.g., the telemetry collector/exporter) and given through asset inventory service 320.

By pushing a policy to networking equipment 308, the corresponding networking equipment 308 can enforce the policy by applying it to any traffic flow in network 302. If the traffic flow is then deemed non-compliant, the networking equipment 308 can initiate a corrective measure, such as blocking the flow from reaching its destination, raising an alarm, redirecting the flow, or the like.

Note that, in some cases, it may not be possible for policy service 316 to perform an exact match between a discovered device and an existing policy, through the use of tags alone. In such a situation, policy service 316 may leverage a machine learning classifier (e.g., a neural network or the like) to perform such a matching, using the tags and other metadata information about the device (e.g., its observed communication patterns, etc.). Note also that the deployed sensor(s) in networking equipment 308 can also update the tags for a particular device over time, as well. If this occurs, policy service 316 may re-evaluate the policy assigned to that device.

In some implementations, enforcement of the identified policy can be achieved by passing the policy to security service 318. This can be achieved via application programming interface (API) export or, as noted above, by embedding the assigned tags directly into the telemetry exports that are ingested, parsed, and processed by the security processes of networking equipment 308. In addition, the analyzer can group flows by their expected context, for purposes of visualizations. For instance, such a visualization could show all OT devices that are slaves of a particular SCADA master.

By comparing the flow details that have enhanced with the tag information to the deployed policy, the security mechanism can identify policy violations. For example, OT devices use very prescribed flows, such as SCADA service 314 being restricted to communicating with SCADA endpoints/slaves using a SCADA protocol. If a non-master is shown to be communicating with a SCADA device, even if the protocol and commands were valid, this would be considered a security violation by the enforcing networking equipment 308 and corrective measures initiated.

Said differently, when a new flow is generated, the telemetry collector/exporter may cross reference the IP address(es) of the new flow entry with the type or definition of the asset, to enhance the flow telemetry. In turn, the analyzer of such telemetry can then assess the tags and security policy assigned to the devices, to enforce the policy.

In further embodiments, the policy enforcement can also rely on behavioral analytics, to identify any behavioral anomalies exhibited by an endpoint device. By tracking and updating the activity tags of a device over time using the above techniques, this effectively creates a baseline behavioral profile for that device. Thus, when its behavior suddenly deviates from its expected activities/behaviors, the analyzing networking equipment 308 can initiate a corrective measure. If a new activity tag is associated with the device, this can be compared with its associated policies, to determine whether this new behavior is still acceptable.

Since activity tags can be learned and updated over time, when a new device appears or disappears on network 302, it may also be assigned a temporal tag to indicate that the device should be scrutinized. For example, if a device tagged as critical disappears from the network, a critical alarm could be raised. Similarly, when a new device suddenly appears on the network, it may be assigned a "new" tag and its behavior monitored to a higher degree and/or have more stringent policies applied to it.

For example, HMI 310 may be allowed to load a new program to controller 306, but if a "new" PLC in network 302 similarly attempts to load a program to controller 306, then an alarm may be triggered.

In one embodiment, the networking equipment 308 enforcing a policy may, leverage a Naïve Bayes classifier or other suitable machine learning-based classifier, to determine whether the new device on the network presents a threat. The temporal tags can also be aged out over time, as the device's behavior is deemed normal over a defined period of time and is, thus, trustworthy.

In other words, when either a new endpoint device appears on network 302 or an existing endpoint device begins to operate in a new way (e.g., new tags are added or appear in its traffic flows), the networking equipment 308 enforcing the policies may compute and assess the probability that the endpoint device (and/or its behavior) is either benign or malicious. Data parameters, primarily the component and activity tags, as well as flow characteristics are used as input parameters for this computation. In some embodiments, these data points could also be clustered in an n-dimensional space, to profile both benign and malicious behavior from past events and devices. In turn, a Naïve Bayes classifier could create cluster boundaries for these clusters and classify the endpoint device under scrutiny as either benign or malicious, accordingly.

Closed-Loop Device Profiling for Proactive Behavioral Expectations

As noted above, the nature of the IoT makes network security particularly challenging. In particular, the data streams generated by IoT devices are continually monitored and ingested by ML/AI algorithms to make sense of and to identify insights in the data patterns. When the configurations of these devices are changed, then the data streams they generate often correspondingly change. If an ML model had been trained for a given IoT device, then new data stream could easily be interpreted as anomalous behavior (at least during an interim period while the ML algorithm is re-trained).

Such interpreted anomalies could cause the algorithm to generate false positives/false negatives during this period. Quickly, the operator could become overwhelmed with false alarms, and then begin ignoring and/or dismissing all alarms, as important and legitimate alarms become buried in noise. This is an especially relevant scenario with IoT, as the sheer number of devices can exponentially exacerbate false alarms and to quickly overwhelm operators.

Therefore, the techniques herein are directed toward minimizing false positives/false negatives generated by ML algorithms as a direct result of configuration changes by operators of IoT devices and applications. That is, the techniques herein provide an intelligent closed-loop device profiling for proactive behavioral expectations, where a closed-loop system monitors the operational configuration and data of an IoT device (both the commands and the variables) and proactively shares the semantics of any operator-configured changes with an analytics platform (that is running ML algorithms) enabling it to be more intelligent in identifying actual anomalies, noteworthily by suppressing false alarms that are the direct result of the configured changes.

Specifically, according to one or more embodiments of the disclosure as described in detail below, a device controller determines a deliberate change to be made within a network, and generates a profile of a behavioral update that an analytics engine should expect to see based on the deliberate change. The device controller then transmits, to the analytics engine, the profile of the behavioral update to cause the analytics engine to proactively expect the behavioral update in response to the deliberate change.

Illustratively, the techniques described herein may be performed by hardware, software, and/or firmware, such as in accordance with the network management process 248, which may include computer executable instructions executed by the processor 220 to perform functions relating to the techniques described herein, e.g., particularly as part of an IoT device controller, as described below.

Figure 6:
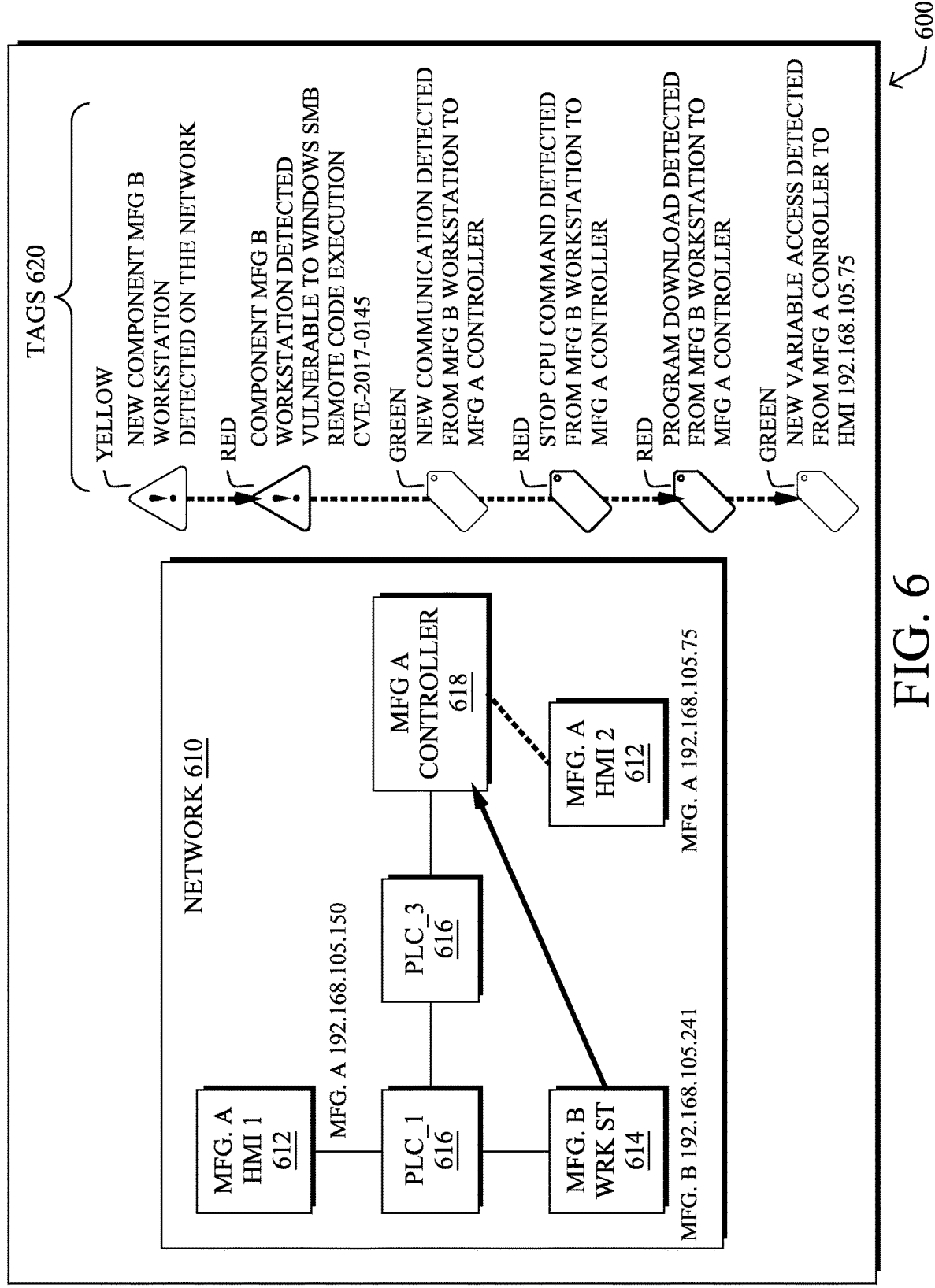
FIG. 6 illustrates an example of IoT device activity tags generated by deep packet inspection of industrial network protocols.

Operationally, and with reference generally to environment 600 of FIG. 6, deep-packet inspection (DPI) technology for industrial network protocols (such as Cyber Vision available from Cisco Systems, Inc.) decodes instructions sent and received by IoT devices (via industrial protocols) to analyze their behavior. As noted above, such behavior can be expressed as "Activity Tags" (e.g., as used by Cyber Vision).

For example, as shown in FIG. 6, a visualization of IoT Device "Activity Tags" generated by DPI of industrial network protocols, a network 610 may have an illustrative set up of a number of HMIs 612 (e.g., from manufacturer "MFG A", such as "HMI 1" and "HMI 2") and workstations 614 (e.g., from manufacturer "MFG B WRK ST"), interconnected with a number of PLCs 616 (e.g., "PLC_1", "PLC_2") and other controllers 618 (e.g., "MFG A controller", such as a process controller for system solutions in the fields of manufacturing and process automation).

As shown, for example, tags 620 may range from green (no alert), to yellow (possible alert or warning), to red (alert, alarm, anomaly, etc.). In the example shown, for instance, the following tags 620 may be presented in the order of a given workflow:

(Yellow) New component mfg B workstation detected on the network;

(Red) Component mfg B workstation detected vulnerable to Windows® SMB Remote Code Execution CVE-2017-0145;

(Green) New communication detected from mfg B workstation to MFG A controller;

(Red) Stop CPU command detected from mfg B workstation to MFG A controller;

(Red) Program Download detected from mfg B workstation to MFG A controller;

(Green) New variable access detected from MFG A controller to HMI 192.168.105.75 (HMI 2).

Thus, the behavior patterns of IoT devices can be profiled. When anomalous behavior is observed based on such profiling, these alerts can be generated and brought to the operator's attention.

Figure 7:
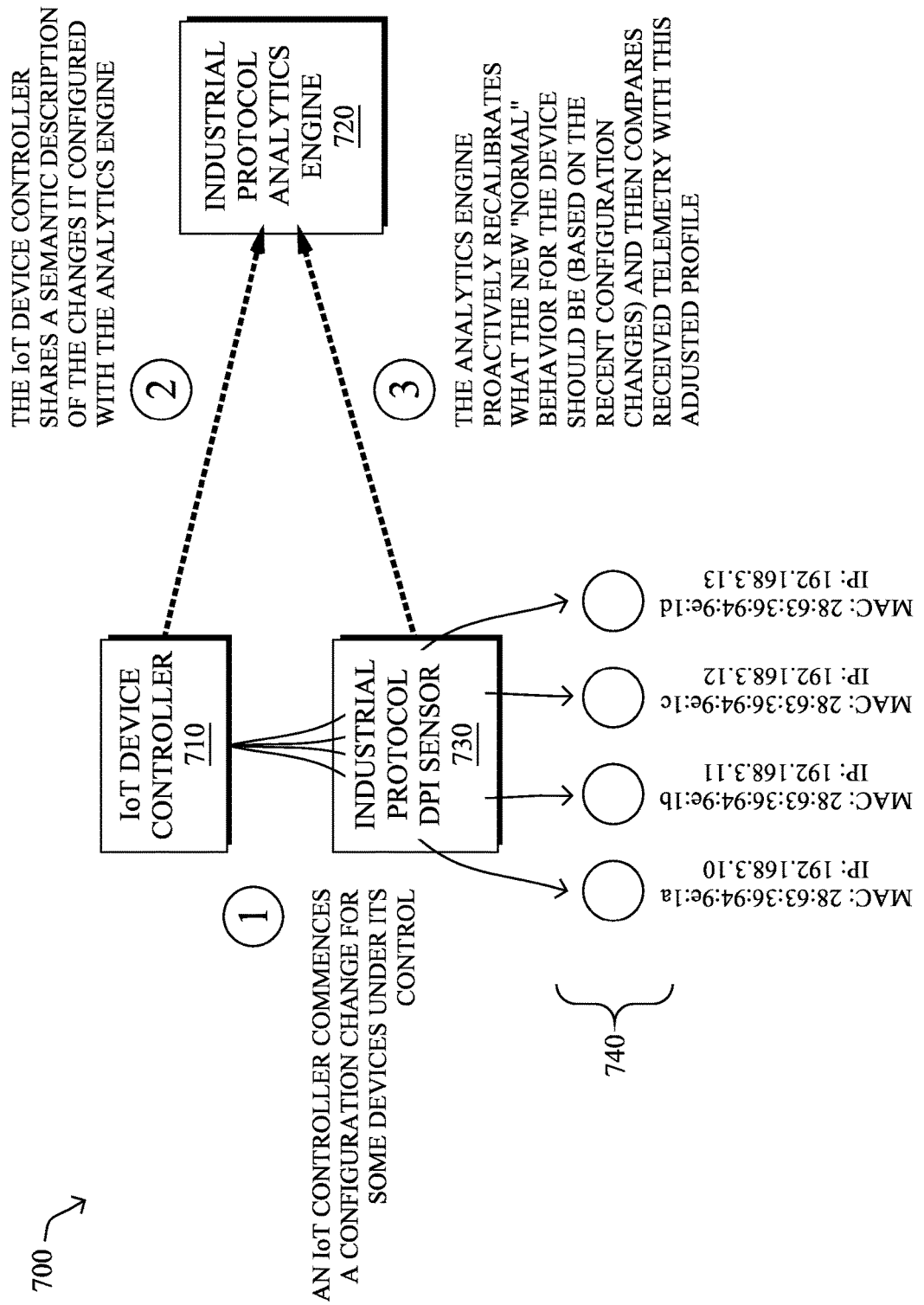
FIG. 7 illustrates an example of an intelligent closed-loop system for IoT device configuration and monitoring.

To minimize false alerts that are the direct results of the configuration changes of IoT devices, the techniques herein, therefore, propose a system for intelligent closed-loop for IoT device configuration and monitoring, such as illustrated in the example environment 700 of FIG. 7.

In particular, an illustrative operation of the techniques herein may be as follows:

Step 1) An IoT device controller 710 commences a configuration change for some IoT devices 740 under its control. These configuration commands may be transmitted be via encrypted protocols, and as such, any Deep Packet Inspection (DPI) sensors 730 running on intermediate network devices would not be privy to the details contained within these messages.

Step 2) The IoT Device Controller 710 shares a semantic description of the changes it configured with the analytics engine 720 (e.g., a Cyber Vision Center) so that modifications to classification of alarms can be updated in real time. A description of the configuration changes could be expressed using similar "Activity Tag" semantics—that is, new activity tags are proactively added to the profile of the IoT device so that alarms are not misclassified. Some examples include:

The IoT device will now perform operation X at a new time-period interval;

The IoT device will now increase/decrease its output of Y;

The IoT device will report Z more/less frequently;

Etc.

Step 3) The analytics engine 720 proactively recalibrates what the new "normal" behavior for the device(s) should be (based on the recent configuration changes reported by the IoT device controller). Then, as ongoing telemetry is received from the DPI sensors 730 of the industrial protocols being transmitted and received by these IoT devices 740, the analytics engine 720 compares the received telemetry with this adjusted profile. In this manner, the analytics engine reduces the number of false negatives/false positives that it would have ordinarily generated and reported as a direct result of the configuration change, which it would previously been unaware of (or possibly just unaware of the details of).

Figure 8:
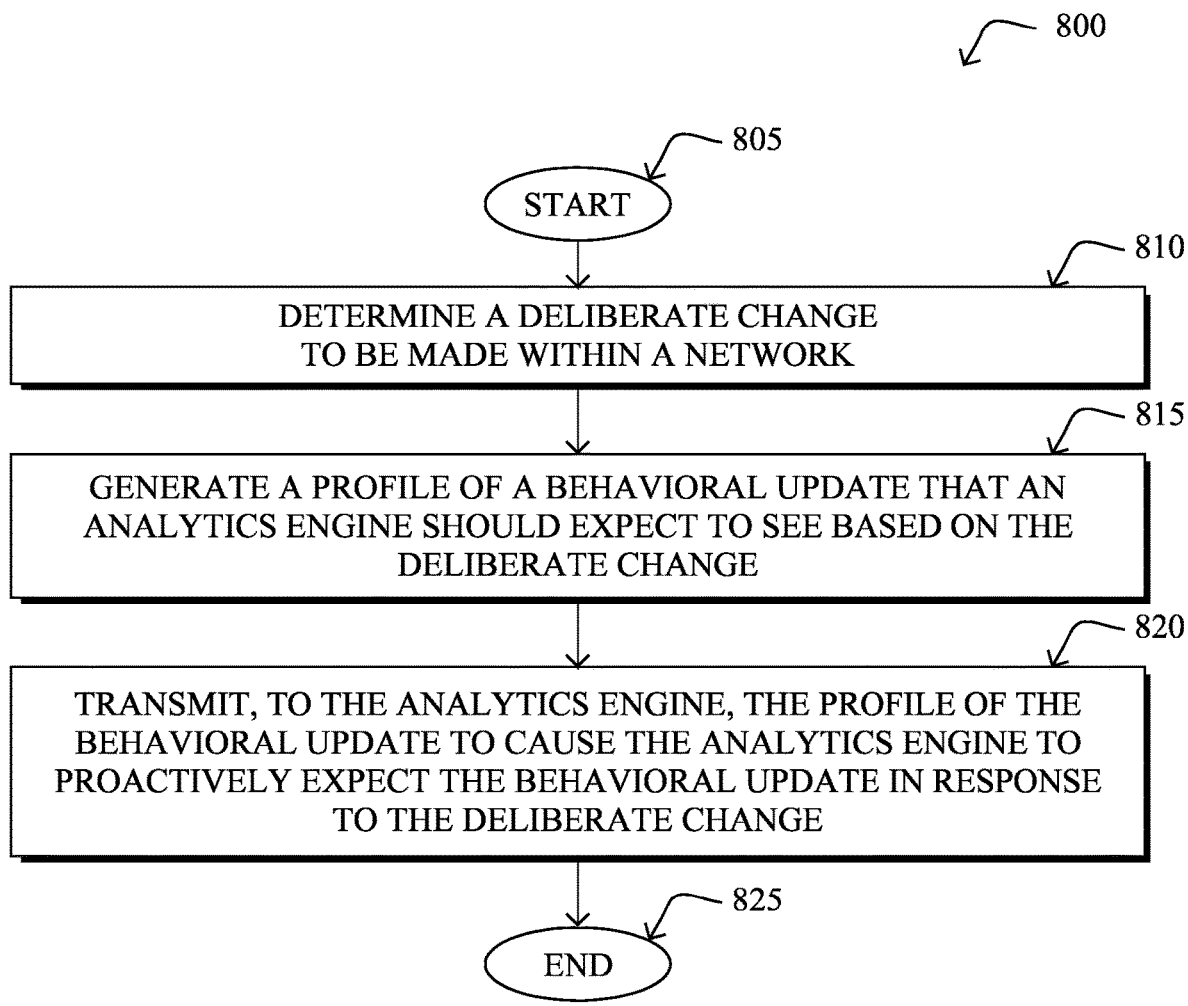
FIG. 8 illustrates an example simplified procedure for intelligent closed-loop device profiling for proactive behavioral expectations.

FIG. 8 illustrates an example simplified procedure 800 for intelligent closed-loop device profiling for proactive behavioral expectations in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, a device controller 710 determines a deliberate change to be made within a network (e.g., based conditions such as new configurations of a device, new operation of an application on a device, a new device, a removed device, a new path, a software update, a firmware update, a patch, and so on).

In step 815, the device controller may then generate a profile of a behavioral update that an analytics engine 720 should expect to see based on the deliberate change. For instance, as described above, the profile may comprise behavioral updates such as, e.g., an updated cadence, an updated periodicity, an updated amount of transmitted data, an updated type of data, an updated destination for data, and so on. As detailed above, the profile of the behavioral update may be based on generating one or more activity tags as a semantic description of the behavioral update that the analytics engine should expect to see. (Also worth nothing, the profile of the behavioral update may be based on an actual behavior to expect, or in alternative or additional embodiments, may be based on alarm condition thresholds to change based on the behavioral update and/or a new machine learning model based on the behavioral update.)

In step 820, the device controller may then transmit, to the analytics engine, the profile of the behavioral update to cause the analytics engine to proactively expect the behavioral update in response to the deliberate change. Note that in response to not seeing the behavioral update, the analytics engine may declare an anomalous condition. In one embodiment, in particular, the profile of the behavioral update comprises a time at which the behavioral update is expected to be seen, and as such, in response to not seeing the behavioral update after that time, the analytics engine may declare an anomalous condition. (Or, alternative, if a change is seen prior to that time, an anomaly may also be declared.)

The simplified procedure 800 may then end in step 825, notably with the option to continue determining further updates and proactively sharing the corresponding profiles of expected behavior changes, accordingly. Other steps may also be included generally within procedure 800. For example, such steps (or, more generally, such additions to steps already specifically illustrated above), may include: adding the one or more activity tags to the profile of one or more particular devices in the network for which the behavioral update is expected to be seen; and so on.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for intelligent closed-loop device profiling for proactive behavioral expectations. In particular, the techniques herein proactively inform a security analytics engine of the expected changes in device behavior to reduce the false positives/negatives that such a system would ordinarily generate as it compared post-configuration device behavior with a pre-configuration behavior profile. That is, the techniques herein enable suppression of false anomaly-based alarms that are the direct result of operator-directed changes, recalibrating baseline/expected conditions based on the newly applied configurations. As opposed to systems that merely adapt to changes, accept detected changes, or even that indicate that "a" change is coming (e.g., based on updates, patches, etc.), the techniques herein proactively pre-determine expected behavior patterns/profiles in a network that would be the result of a deliberate change, and then to prepare the analytics engine to expect the actual change prior to making that change (e.g., indicating "what to expect", not just to "expect some change").

In addition, certain embodiments herein express expected configuration changes using a semantic language based on "Activity Tags", which are already in use in certain security systems today, making implementation of the techniques herein straightforward for such systems.

Note that existing "closed loop systems" may have a controller that automates the configuration of network devices (such as network routers, switches, access points, etc.) and an analytics engine (that monitors these same devices, e.g., Cisco DNA-C). However, there is typically little or no direct communication between the controller and the analytics engine. Additionally, in the case of IoT, another layer of abstraction is added, in that devices are configured by one system (e.g., a device controller), but the behavior of these are monitored from indirect sources (such as sensors running in containers on network devices: that is, not even the IoT devices themselves), which feed up to independent multi-tiered analytics systems.

As an example of differentiation of the techniques herein, assume a system monitors things like software updates, configuration changes, etc., that could result in changes to the data models, where if a new data point aligns to the model, it is considered normal and is accepted, but if it does not fit the model, it is considered anomalous and remediation actions are taken. Thus, this is a reactive system (comparing new data events to a previously trained model). The techniques herein, however, are proactive. In other words, when a configuration change is made (or a new communication path is added, or a software upgrade is made, etc.), the semantic description of these changes are automatically added to the analytics system as described above. This allows the system to be proactively updated so that new events do not appear anomalous or suspicious in the first place. As opposed to the simpler reactive model noted previously, the changing profile of the IoT device has already been updated, removing the need to look for violations in an ML model. In essence, the techniques herein allow the analytics engine to proactively recalibrate what the new "normal" behavior for device should be as they are configured or updated (based on the recent configuration changes reported by the IoT device controller), meaning there is no need to go through retraining of an ML model, or to look for outliers.

Further on this example, assume the previous system is in use and an authorized operator has increased the speed that a given IoT device is to operate at by 50%, but has made no further changes. This system would see this as anomalous and not aligning with the existing trained model. It would be alerted as an outlier and remediation would be taken. However, with the techniques herein, when the change is made, the control change automatically creates the new activity tag, updates the semantic description on the analytics system, and when a speed change is detected, it is already considered the "new normal" and is not considered a violation or a serious alert. That is, the ML algorithm according to the techniques herein would know to expect a corresponding increase in device operation speed by 50% and would monitor the device speed within the framework of this new additional context. Noteworthily the ML algorithm would not trigger an anomaly-based alarm while the speed was being increased by 50%; it would only do so if the speed significantly deviated from this new and revised target. As such, there is significant benefit and improvement in monitoring details of the operational configuration and data of an IoT device, both the commands and the variables (and not just metadata about the data models in use), and proactively sharing the semantics of these deliberate configuration changes with the ML models to enable these to become more intelligent in identifying actual anomalies, and suppressing false alarms as a direct result of configuration changes.

According to the embodiments herein, an illustrative method herein may comprise: determining, at a device controller, a deliberate change to be made within a network; generating, by the device controller, a profile of a behavioral update that an analytics engine should expect to see based on the deliberate change; and transmitting, from the device controller to the analytics engine, the profile of the behavioral update to cause the analytics engine to proactively expect the behavioral update in response to the deliberate change.

In one embodiment, in response to not seeing the behavioral update, the analytics engine is caused to declare an anomalous condition.

In one embodiment, the deliberate change is based on one or more conditions selected from a group consisting of: new configuration of a device; new operation of an application on a device; a new device; a removed device; and a new path.

In one embodiment, the profile comprises one or more behavioral updates selected from a group consisting of: an updated cadence; an updated periodicity; an updated amount of transmitted data; an updated type of data; and an updated destination for data.

In one embodiment, generating the profile of the behavioral update that the analytics engine should expect to see based on the deliberate change comprises: generating one or more activity tags as a semantic description of the behavioral update that the analytics engine should expect to see. In one embodiment, the method further comprises: adding the one or more activity tags to the profile of one or more particular devices in the network for which the behavioral update is expected to be seen.

In one embodiment, the profile of the behavioral update is based on one or more of: an actual behavior to expect; alarm condition thresholds to change based on the behavioral update; and a new machine learning model based on the behavioral update.

In one embodiment, the profile of the behavioral update comprises a time at which the behavioral update is expected to be seen. In one embodiment, in response to not seeing the behavioral update after the time at which the behavioral update is expected to be seen, the analytics engine is caused to declare an anomalous condition.

According to the embodiments herein, an illustrative tangible, non-transitory, computer-readable medium herein may have computer-executable instructions stored thereon that, when executed by a processor on a computer, may cause the computer to perform a method comprising: determining a deliberate change to be made within a network; generating a profile of a behavioral update that an analytics engine should expect to see based on the deliberate change; and transmitting, to the analytics engine, the profile of the behavioral update to cause the analytics engine to proactively expect the behavioral update in response to the deliberate change.

Further, according to the embodiments herein an illustrative apparatus herein may comprise: a processor configured to execute one or more processes; and a memory configured to store a process that is executable by the processor, the process, when executed, configured to: determine a deliberate change to be made within a network; generate a profile of a behavioral update that an analytics engine should expect to see based on the deliberate change; and transmit, to the analytics engine, the profile of the behavioral update to cause the analytics engine to proactively expect the behavioral update in response to the deliberate change.

While there have been shown and described illustrative embodiments herein, it is to be understood that various other adaptations and modifications may be made within the intent and scope of the embodiments herein. For example, while specific endpoint device types are described, the techniques can be applied to any number of different types of devices. Further, while the techniques herein are described as being performed at certain locations within a network, the techniques herein could also be performed at other locations, as desired (e.g., fully in the cloud, fully within the local network, etc.). Also, while certain protocols and/or network environments have been shown, these are merely examples of specific implementations of the techniques herein, and the embodiments herein are not so limited.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   identifying, at a device controller, one or more devices in a network, the one or more devices associated with a first behavior profile of normal data stream behavior that an analytics engine deems non-anomalous from the one or more devices within the network;
   determining, at the device controller, a deliberate configuration change to be made for the one or more devices in the network that is determined to result in a behavioral update to the normal data stream behavior by the one or more devices in the network that is anomalous to the analytics engine according to the first behavior profile;
   generating, by the device controller, a post-configuration behavior profile of the behavioral update that the analytics engine deems as a new normal data stream behavior for the one or more devices based on the deliberate configuration change within the network for the one or more devices;
   transmitting, from the device controller to the analytics engine and prior to making the deliberate configuration change, the post-configuration behavior profile of the behavioral update for the one or more devices in the network: and
   recalibrating, by the analytics engine, the new normal data stream behavior for the one or more devices to deem the behavioral update as non-anomalous in response to the deliberate configuration change to the one or more devices in the network.

2. The method as in claim 1, wherein in response to not detecting the behavioral update, the analytics engine is caused to declare an anomalous condition.

3. The method as in claim 1, wherein the deliberate configuration change is based on one or more conditions selected from a group consisting of: new configuration of a device; new operation of an application on a device; a new device; a removed device; and a new path.

4. The method as in claim 1, further comprising:
   adding one or more activity tags to the post-configuration behavior profile of one or more particular devices in the network configured to behave according to the behavioral update.

5. The method as in claim 1, wherein the post-configuration behavior profile of the behavioral update is based on one or more of: an actual behavior to expect; alarm condition thresholds to change based on the behavioral update; and a new machine learning model based on the behavioral update.

6. The method as in claim 1, wherein the post-configuration behavior profile of the behavioral update comprises a time of the behavioral update.

7. The method as in claim 6, wherein in response to not detecting the behavioral update after the time of the behavioral update, the analytics engine is caused to declare an anomalous condition.

8. The method as in claim 1, wherein the post-configuration behavior profile comprises one or more behavioral updates selected from a group consisting of: an updated cadence; an updated periodicity; an updated amount of transmitted data; an updated type of data; and an updated destination for data.

9. A tangible, non-transitory, computer-readable medium having computer-executable instructions stored thereon that, when executed by a processor on a computer, cause the computer to perform a method comprising:
   identifying one or more devices in a network, the one or more devices associated with a first behavior profile of normal data stream behavior that an analytics engine deems non-anomalous from the one or more devices within the network;
   determining a deliberate configuration change to be made for the one or more devices in the network that is determined to result in a behavioral update to the normal data stream behavior by the one or more devices in the network that is anomalous to the analytics engine according to the first behavior profile;
   generating a post-configuration behavior profile of the behavioral update that the analytics engine deems as a new normal data stream behavior for the one or more devices based on the deliberate configuration change within the network for the one or more devices;
   transmitting, to the analytics engine prior to making the deliberate configuration change, the post-configuration behavior profile of the behavioral update for the one or more devices in the network; and
   recalibrating, by the analytics engine, the new normal data stream behavior for the one or more devices to deem the behavioral update as non-anomalous in response to the deliberate configuration change to the one or more devices in the network.

10. The tangible, non-transitory, computer-readable medium as in claim 9, wherein in response to not detecting the behavioral update, the analytics engine is caused to declare an anomalous condition.

11. The tangible, non-transitory, computer-readable medium as in claim 9, wherein the deliberate configuration change is based on one or more conditions selected from a group consisting of: new configuration of a device; new operation of an application on a device; a new device; a removed device; and a new path.

12. The tangible, non-transitory, computer-readable medium as in claim 9, wherein the post-configuration behavior profile of the behavioral update is based on one or more of: an actual behavior to expect; alarm condition thresholds to change based on the behavioral update; and a new machine learning model based on the behavioral update.

13. The tangible, non-transitory, computer-readable medium as in claim 9, wherein the post-configuration behavior profile of the behavioral update comprises a time of the behavioral update.

14. The tangible, non-transitory, computer-readable medium as in claim 13, wherein in response to not detecting the behavioral update after the time of the behavioral update, the analytics engine is caused to declare an anomalous condition.

15. The tangible, non-transitory, computer-readable medium as in claim 9, wherein the post-configuration behavior profile comprises one or more behavioral updates selected from a group consisting of: an updated cadence; an updated periodicity; an updated amount of transmitted data; an updated type of data; and an updated destination for data.

16. An apparatus, comprising:
a processor configured to execute one or more processes; and
a memory configured to store a process that is executable by the processor, the process, when executed, configured to:
identify one or more devices in a network, the one or more devices associated with a first behavior profile of normal data stream behavior that an analytics engine deems non-anomalous from the one or more devices within the network;
determine a deliberate configuration change to be made for the one or more devices in the network that is determined to result in a behavioral update to the normal data stream behavior by the one or more devices in the network that is anomalous to the analytics engine according to the first behavior profile;
generate a post-configuration behavior profile of the behavioral update that the analytics engine deems as a new normal data stream behavior for the one or more devices based on the deliberate configuration change within the network for the one or more devices;
transmit, to the analytics engine and prior to making the deliberate configuration change, the post-configuration behavior profile of the behavioral update for the one or more devices in the network; and
recalibrating, by the analytics engine, the new normal data stream behavior for the one or more devices to deem the behavioral update as non-anomalous in response to the deliberate configuration change to the one or more devices in the network.

17. The apparatus as in claim 16, wherein in response to not detecting the behavioral update, the analytics engine is caused to declare an anomalous condition.

* * * * *